United States Patent
Kim et al.

(10) Patent No.: US 12,452,067 B2
(45) Date of Patent: Oct. 21, 2025

(54) DATA PROCESSING DEVICE AND DATA PROCESSING

(71) Applicants: Hyundai Motor Company, Seoul (KR); Kia Corporation, Seoul (KR)

(72) Inventors: Jin Woo Kim, Seoul (KR); Seok Won Kim, Hwaseong-si (KR); Jung Min Ryu, Hwaseong-si (KR); Yun Jae Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 109 days.

(21) Appl. No.: 18/432,620

(22) Filed: Feb. 5, 2024

(65) Prior Publication Data

US 2025/0119289 A1 Apr. 10, 2025

(30) Foreign Application Priority Data

Oct. 4, 2023 (KR) .......................... 10-2023-0131865

(51) Int. Cl.
*H04L 9/32* (2006.01)
*H04L 9/08* (2006.01)

(52) U.S. Cl.
CPC .......... *H04L 9/3213* (2013.01); *H04L 9/0822* (2013.01)

(58) Field of Classification Search
CPC . H04L 9/3213; H04L 9/0822; H04L 63/0428; H04L 2212/00
See application file for complete search history.

(56) References Cited

U.S. PATENT DOCUMENTS

| | | | | |
|---|---|---|---|---|
| 5,867,494 A | * | 2/1999 | Krishnaswamy | ... H04L 12/1485 379/114.15 |
| 5,867,495 A | * | 2/1999 | Elliott | ................... H04L 65/401 379/93.07 |
| 5,999,525 A | * | 12/1999 | Krishnaswamy | ... H04M 7/1205 379/114.15 |
| 6,335,927 B1 | * | 1/2002 | Elliott | ................. H04L 41/5054 370/352 |

(Continued)

FOREIGN PATENT DOCUMENTS

| | | |
|---|---|---|
| KR | 102333625 B1 | 12/2021 |
| KR | 102383648 B1 | 4/2022 |

*Primary Examiner* — J. Brant Murphy
(74) *Attorney, Agent, or Firm* — Slater Matsil, LLP

(57) ABSTRACT

An embodiment data processing device includes a communication device configured to support communication between the data processing device and a control server, a memory configured to store a program, and one or more processors configured to access the memory and execute the program, wherein the program includes computer-executable instructions for receiving target data from the control server through the communication device, attempting to identify channel filter information regarding the target data in a router database, obtaining encapsulated target data by applying the target data and the channel filter information to a first filter that encapsulates the target data based on the channel filter information being identified in the router database, and transmitting the encapsulated target data to a target service module of the target data by applying the encapsulated target data to a second filter that converts a format of the encapsulated target data.

20 Claims, 9 Drawing Sheets

(56) References Cited

U.S. PATENT DOCUMENTS

| | | | | |
|---|---|---|---|---|
| 6,731,625 B1* | 5/2004 | Eastep | ................ | H04M 7/128 379/93.07 |
| 6,754,181 B1* | 6/2004 | Elliott | ................ | H04L 65/401 370/252 |
| 6,909,708 B1* | 6/2005 | Krishnaswamy | ..... | H04L 65/104 379/93.07 |
| 7,145,898 B1* | 12/2006 | Elliott | ................ | H04L 65/103 379/900 |
| 2020/0167144 A1* | 5/2020 | You | ................ | H04W 4/50 |
| 2020/0234183 A1* | 7/2020 | Ghatage | ................ | G06N 20/00 |

* cited by examiner

```
first_filter(target_data)
{
    const key = "patrol_robot";                                                                                ─610
    const decoded_target_data = Crypto.AES.decrypt(target_data, key).toString(Crypto.enc.Utf8);

try {                                                                                                       ─620
        const parsed = JSON.parse(decoded_target_data);
    } catch(e) {
        throw "JSON type converting failed";
    } if(parsed.authToken !== "jefk2ad1"){                                                                         ─630
        throw "authToken failed";
    } const payload = {                                                                                           ─640
        target_data.command,
        target_data.status,
        target_data.message
    };

payload.CHANNEL_TAG = "CHANNEL_NAME";                                                                        ─650 const encoded = Crypto.AES.encrypt(payload, key).toString();                                                 ─660 const header = "ROBOT_APP_INFO";                                                                             ─670
    const tail = "ROBOT_SERIAL_INFO";
    const encapsulated = `${header}${encoded}${tail}`;

return encapsulated;
}
```

FIG 6

```
second_filter(encapsulated)
{
    if(typeof encapsulated == 'string'){
        return Buffer.from(encapsulated, 'Utf8');
    }
    else if(typeof encapsulated == 'xml'){
        return XML.HtmlBuild(encapsulated);
    }
    else{
        return JSON.stringify(encapsulated);
    }
}
```

| CHANNEL FILTER INFORMATION | | | |
|---|---|---|---|
| INSTRUCTION | ServerToIedMideBehavior | | |
| DESCRIPTION | LED activation command from control server to BehaviorManager | | |
| TAG | HMGICS-SINGAPORE | | |
| LOGGING | ⚪ | | |
| USE | ⚪ | | |
| RECEPTION TYPE | KAFKA ⌄ | | |
| RECEPTION OPTION | kafkaDataType | | CUSTOM |
| | kafkaDataSubType | | |
| | kafkaDataCommand | | ledModeBehaviorInfo |
| TRANSMISSION TYPE | (ZEROMQ ⊗) (KAFKA ⊗) ⌄ | | |
| TRANSMISSION OPTIONS | zmqName | | behavior-manager |
| | zmqCommand | | behaviorInfo |
| | kafkaDataType | | |
| | kafkaDataSubType | | |
| | kafkaDataCommand | | |

FIG.8

DATA PROCESSING DEVICE AND DATA PROCESSING

CROSS-REFERENCE TO RELATED APPLICATIONS

This application claims the benefit of Korean Patent Application No. 10-2023-0131865, filed on Oct. 4, 2023, which application is hereby incorporated herein by reference.

TECHNICAL FIELD

The present disclosure relates to a data processing device and a data processing method.

BACKGROUND

A self-driving service robot is a complex of various technologies and thus includes a software structure based on multiple modules. Each of the modules is exposed to the outside in the form of a service end-point (access point) API, and all actual business logics are abstracted. Technical details such as logic, architecture, programming language, database, and quality maintenance system are obscured by the API. Each module has independence and may have flexibility in the process of applying new technology to the module. Such a system may have the advantage that, even when a failure occurs in a specific module among the modules, the failure does not affect other modules.

On the other hand, a process of designing the above-mentioned system is complex, and there may be a problem in how to configure communication considering all service modules due to a distributed structure. In other words, end-point API management is important for the above-mentioned system, and compatibility between dozens or hundreds of modules needs to be checked. Additionally, it may be difficult to develop and maintain an integrated structure and perform data management, such as uniform policy application, security system introduction, and integrated testing.

To solve these problems, it is necessary to develop technologies that enable efficient data transmission, reception, and management by unifying different development languages, protocols, and data formats for each service module of the robot system.

SUMMARY

The present disclosure relates to a data processing device and a data processing method. Particular embodiments relate to a technology for processing data received from a control server.

Embodiments of the present disclosure can solve problems occurring in the prior art while advantages achieved by the prior art are maintained intact.

An embodiment of the present disclosure provides a data processing device and a data processing method capable of performing data exchange based on one channel filter information by identifying channel filter information related to target data in a router database, even when service modules have different development languages, protocols, and data formats and increasing maintenance of data communication for each service module.

An embodiment of the present disclosure provides a data processing device and a data processing method capable of obtaining encapsulated target data by applying target data and channel filter information to a first filter that encapsulates the target data to solve the problem of difficulty in applying comprehensive authentication policies due to a distributed structure and uniformly applying authentication and security policies to all service modules by simply writing a script in the first filter.

An embodiment of the present disclosure provides a data processing device and a data processing method capable of applying encapsulated target data to a second filter that converts the format of the encapsulated target data, in which integration is possible simply by registering a channel through UI without additional implementation of different protocols and data formats used for linking internal/external service modules and linking service modules by simply writing a script according to the reception format of each target service module.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a data processing device includes a memory that stores computer-executable instructions, at least one processor that accesses the memory and executes the instructions, and a communication device that supports communication between the data processing device and a control server, wherein the at least one processor receives target data from the control server through the communication device, identifies channel filter information regarding the target data in a router database (DB), obtains encapsulated target data by applying the target data and the channel filter information to a first filter that encapsulates the target data based on the channel filter information being identified in the router database, and transmits the encapsulated target data to a target service module of the target data by applying the encapsulated target data to a second filter that converts a format of the encapsulated target data.

According to an embodiment, the at least one processor may convert the target data to unregistered data based on the channel filter information not being identified in the router database and transmit the unregistered data to the control server through the communication device.

According to an embodiment, the at least one processor may decode the target data with a predetermined key based on the target data and the channel filter information being applied to the first filter and parse the decoded target data into a target format to obtain parsed data.

According to an embodiment, the at least one processor may verify whether the parsed data includes a predetermined authentication token based on the decoded target data being parsed according to the target format and the parsed data being obtained and generate payload data by extracting a first packet related to a command, a second packet related to a data state, and a third packet related to a message from the target data.

According to an embodiment, the at least one processor may encode the payload data based on the predetermined key and obtain the encapsulated data by applying a header related to information about a robot including the data processing device and a tail related to serial information of the robot to the encoded payload data.

According to an embodiment, the at least one processor may convert the target data into abnormal data based on a failure in parsing of the decoded target data based on the target format and transmit the abnormal data and the channel filter information to the control server through the communication device.

According to an embodiment, the at least one processor may convert the target data into abnormal data based on the authentication token not being included in the decoded target data and transmit the abnormal data and the channel filter information to the control server through the communication device.

According to an embodiment, the at least one processor may obtain a reception format of the target service module extracted from the channel filter information and transmit the encapsulated target data by converting the format of the encapsulated target data to the reception format.

According to an embodiment, the data processing device may further include a user interface that receives source codes of the first filter and the second filter from a user. The at least one processor may apply the source codes input through the user interface to at least one of the first filter, the second filter, or any combination thereof.

According to an embodiment, the at least one processor may identify at least one of a command related to the target data, a reception type, a transmission type, the target service module, or any combination thereof from the user interface and generate the channel filter information by binding at least one of the command, the reception type, the transmission type, the target service module, or any combination thereof.

According to an embodiment of the present disclosure, a data processing method includes receiving target data from a control server through a communication device, identifying channel filter information regarding the target data in a router database (DB), obtaining encapsulated target data by applying the target data and the channel filter information to a first filter that encapsulates the target data based on the channel filter information being identified in the router database, and transmitting the encapsulated target data to a target service module of the target data by applying the encapsulated target data to a second filter that converts a format of the encapsulated target data.

According to an embodiment, the identifying of the channel filter information regarding the target data may include converting the target data to unregistered data based on the channel filter information not being identified in the router database and transmitting the unregistered data to the control server through the communication device.

According to an embodiment, the obtaining of the encapsulated target data may include decoding the target data with a predetermined key based on the target data and the channel filter information being applied to the first filter and parsing the decoded target data into a target format to obtain parsed data.

According to an embodiment, the data processing method may further include verifying whether the parsed data includes a predetermined authentication token based on the decoded target data being parsed according to the target format and the parsed data being obtained and generating payload data by extracting a first packet related to a command, a second packet related to a data state, and a third packet related to a message from the target data.

According to an embodiment, the data processing method may further include encoding the payload data based on the predetermined key and obtaining the encapsulated data by applying a header related to information about a robot including a data processing device and a tail related to serial information of the robot to the encoded payload data.

According to an embodiment, the obtaining of the parsed data may include converting the target data into abnormal data based on a failure in parsing of the decoded target data based on the target format and transmitting the abnormal data and the channel filter information to the control server through the communication device.

According to an embodiment, the verifying of whether the parsed data includes the authentication token may include converting the target data into abnormal data based on the authentication token not being included in the decoded target data and transmitting the abnormal data and the channel filter information to the control server through the communication device.

According to an embodiment, the obtaining of the encapsulated target data may include obtaining a reception format of the target service module extracted from the channel filter information and transmitting the encapsulated target data by converting a format of the encapsulated target data to the reception format.

According to an embodiment, the data processing method may further include applying the source codes input through the user interface to at least one of the first filter, the second filter, or any combination thereof.

According to an embodiment, the data processing method may further include identifying at least one of a command related to the target data, a reception type, a transmission type, the target service module, or any combination thereof from the user interface and generating the channel filter information by binding at least one of the command, the reception type, the transmission type, the target service module, or any combination thereof.

BRIEF DESCRIPTION OF THE DRAWINGS

The above and other objects, features, and advantages of embodiments of the present disclosure will be more apparent from the following detailed description taken in conjunction with the accompanying drawings, in which:

FIG. 6 is a diagram illustrating source codes that implement a first filter in a data processing device according to an embodiment of the present disclosure;

FIG. 7 is a diagram illustrating source codes that implement a second filter in a data processing device according to an embodiment of the present disclosure;

FIG. 8 is a diagram illustrating a method of generating channel filter information based on information extracted from a user interface in a data processing device according to an embodiment of the present disclosure.

In the description of the drawings, the same or similar reference numerals may be used for the same or similar components.

DETAILED DESCRIPTION OF ILLUSTRATIVE EMBODIMENTS

Figure 1:
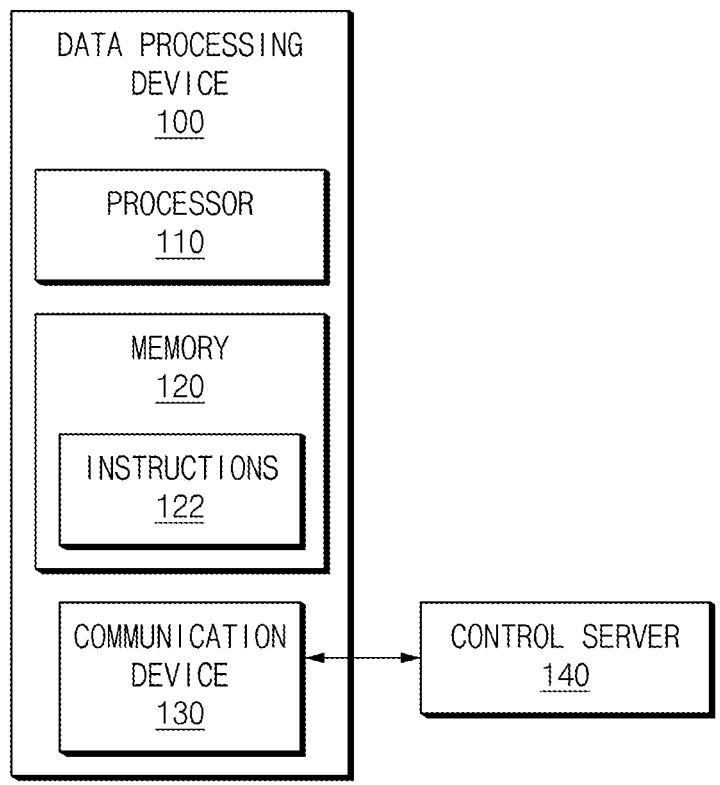
FIG. 1 is a diagram showing a data processing device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the embodiments of the present disclosure. In particular, various embodiments of the disclosure may be described with reference to the accompanying drawings. However, this is not intended to limit the technology described herein to specific embodiments, and those of ordinary skill in the art will recognize that modifications, equivalents, and/or alternatives on the various embodiments described herein can be variously made without departing from the scope and spirit of the disclosure. With regard to the description of the drawings, similar components may be marked by similar reference numerals.

In describing the components of the embodiments according to the present disclosure, terms such as first, second, "A," "B," (a), (b), and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application. For example, terms such as "first," "second," and the like used in the disclosure may be used to refer to various components regardless of the order and/or the priority and to distinguish the relevant components from other components, but they do not limit the components. For example, "a first user device" and "a second user device" indicate different user devices regardless of the order or priority. For example, without departing from the scope of the disclosure, a first component may be referred to as a second component, and similarly, a second component may be referred to as a first component.

In the disclosure, the expressions "have," "may have," "include" and "comprise," or "may include" and "may comprise" used herein indicate the existence of corresponding features (e.g., components such as numeric values, functions, operations, or parts) but do not exclude the presence of additional features.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the disclosure may be used as, for example, the expression "suitable for," "having the capacity to," "designed to," "adapted to," "made to," or "capable of."

The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device. Terms used in the disclosure are merely used to describe specific embodiments and may not be intended to limit the scope of other embodiments. Terms used in the disclosure are merely used to describe specific embodiments and may not be intended to limit the scope of other embodiments. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined in various embodiments of the disclosure. In some cases, even if terms are terms which are defined in the disclosure, they may not be interpreted to exclude embodiments of the disclosure.

In the disclosure, the expressions "A or B," "at least one of A and/or B," or "one or more of A and/or B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included. Additionally, in describing the components of embodiments of the present disclosure, phrases such as "A or B," "at least one of A and B," "at least one of A or B," "A, B, or C," "at least one of A, B, and C," "at least one of A, B, or C," and "at least one of A, B, C, or any combination thereof" may include any one of the items listed together or any possible combination of them. In particular, phrases such as "at least one of A, B, C, or any combination thereof" may include A or B or C or a combination thereof such as AB or ABC.

Hereinafter, embodiments of the present disclosure will be described in detail with reference to FIGS. 1 to 9.

FIG. 1 is a diagram showing a data processing device according to an embodiment of the present disclosure.

A data processing device 100 according to an embodiment may include a processor 110, a memory 120 including instructions 122, and a communication device 130.

The data processing device 100 may refer to a device that processes target data received from a control server 140 to transmit the target data to a service module included in a robot system. For example, the data processing device 100 may receive target data from the control server 140 through the communication device 130. Here, the target data may represent data that needs to be transmitted from the control server 140 to a service module included in a robot system.

The data processing device 100 may identify channel filter information regarding target data in a router database. Here, the router database may include at least one piece of channel filter information. The channel filter information may include information about sequences in which target data is routed until the target data is received by the data processing device 100 and transmitted to the service module. For example, the channel filter information may include a command related to target data, a reception type received from the control server 140, a transmission type transmitted to a target service module, and the target service module.

The data processing device 100 may apply target data and channel filter information to a first filter for encapsulating the target data, based on the channel filter information regarding the target data being identified in the router database to obtain the encapsulated target data. For example, the first filter may be a data proxy filter, which represents a function that performs encapsulation regarding a process for decoding, parsing, verifying, tagging, encrypting, and encoding target data. A detailed description of this will be provided later with reference to FIG. 6 below.

The data processing device 100 may transmit the encapsulated target data to a target service module of the target data by applying the encapsulated target data to a second filter that converts the format of the encapsulated target data. For example, the second filter may represent a function that converts the format of the encapsulated target data according to the reception format of the target service module. A detailed description of this will be provided later with reference to FIG. 7 below.

By performing the above-described operations, the data processing device 100 may transmit the target data to the target service module, regardless of the different development languages, protocols, and data communication formats for a plurality of service modules included in the robot system.

The processor 110 may execute software and control at least one other component (e.g., a hardware or software component) connected to the processor 110. The processor 110 may also perform various data processing or operations. For example, the processor 110 may store target data, channel filter information, and encapsulated target data in the memory 120.

For reference, the processor 110 may perform all operations performed by the data processing device 100. Therefore, for convenience of description, in this specification, operations performed by the data processing device 100 are mainly described as operations performed by the processor 110. Additionally, in this specification, for convenience of description, the processor 110 is mainly described as a single processor, but it is not limited thereto. For example, the data processing device 100 may include one or more processors. Each of the one or more processors may perform all operations related to the operation.

The memory 120 may temporarily and/or permanently store a variety of data and/or information required to process or transmit target data. For example, the memory 120 may store target data, channel filter information, and encapsulated target data.

The communication device 130 may support communication between the data processing device 100 and the control server 140. For example, the communication device 130 may include one or more components that enable communication between the data processing device 100 and the control server 140. For example, the communication device 130 may include a short range wireless communication unit, a microphone, and the like. In this case, short range communication technology may include wireless LAN (Wi-Fi), Bluetooth, ZigBee, WFD (Wi-Fi Direct), UWB (ultrawideband), infrared communication (IrDA, infrared Data Association), BLE (Bluetooth Low Energy), NFC (Near Field Communication), or the like, but it is not limited thereto.

Figure 2:
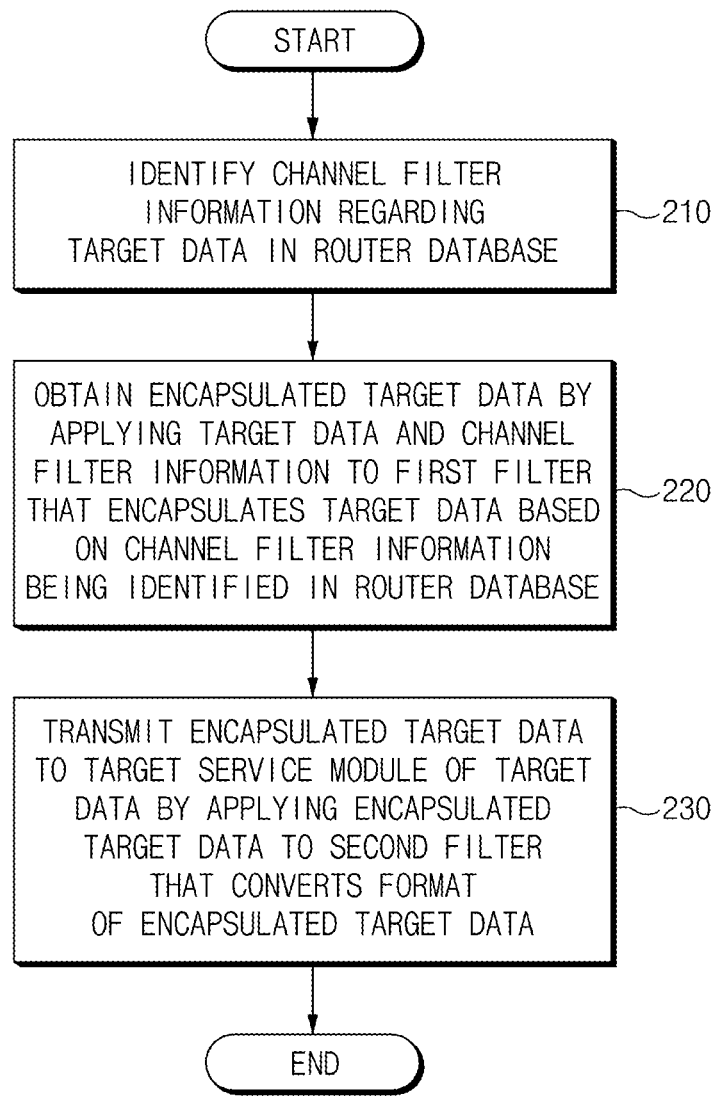
FIG. 2 is a flowchart for describing a data processing method according to an embodiment of the present disclosure.

FIG. 2 is a flowchart for describing a data processing method according to an embodiment of the present disclosure.

In operation 210, a data processing device (e.g., the data processing device 100 in FIG. 1) according to an embodiment may receive target data from a control server through a communication device and identify channel filter information regarding the target data from a router database. For example, the data processing device may receive the target data through the communication device that complies with the Robot Operating System (ROS) communication protocol, the Apache Kafka (KAFKA) communication protocol, and the Message Queue (MQ) communication protocol. The data processing device may identify channel filter information regarding the target data by identifying whether the channel filter information regarding the target data is registered and/or stored in the router database. When the data processing device identifies the channel filter information regarding the target data, the data processing device may extract and/or obtain the channel filter information regarding the target data to be applied to a first filter.

In operation 220, the data processing device may obtain encapsulated target data by applying the target data and the channel filter information to the first filter that encapsulates the target data, based on the channel filter information being identified in a router database. For example, the data processing device may apply the target data and the channel filter information to the first filter having the form of a function written in a script (e.g., java script or python) that receives the target data as a parameter. Through this, the data processing device may obtain the encapsulated target data from the first filter. The first filter may be generated by source codes input through a user interface. A user may write operations desired to be implemented in the first filter with source codes and input the written source codes into the user interface.

In operation 230, the data processing device may transmit the encapsulated target data to a target service module of the target data by applying the encapsulated target data to a second filter that converts the format of the encapsulated target data. For example, the data processing device may apply the encapsulated target data to a second filter having the form of a function written in a script (e.g., java script or python) that receives the encapsulated target data as a parameter. Through this, the data processing device may obtain, from the second filter, data which has been converted into a format associated with the reception module of the target service module. The second filter may be generated by source codes input through the user interface. A user may write operations desired to be implemented in the second filter with source codes and input the written source codes into the user interface.

Figure 3:
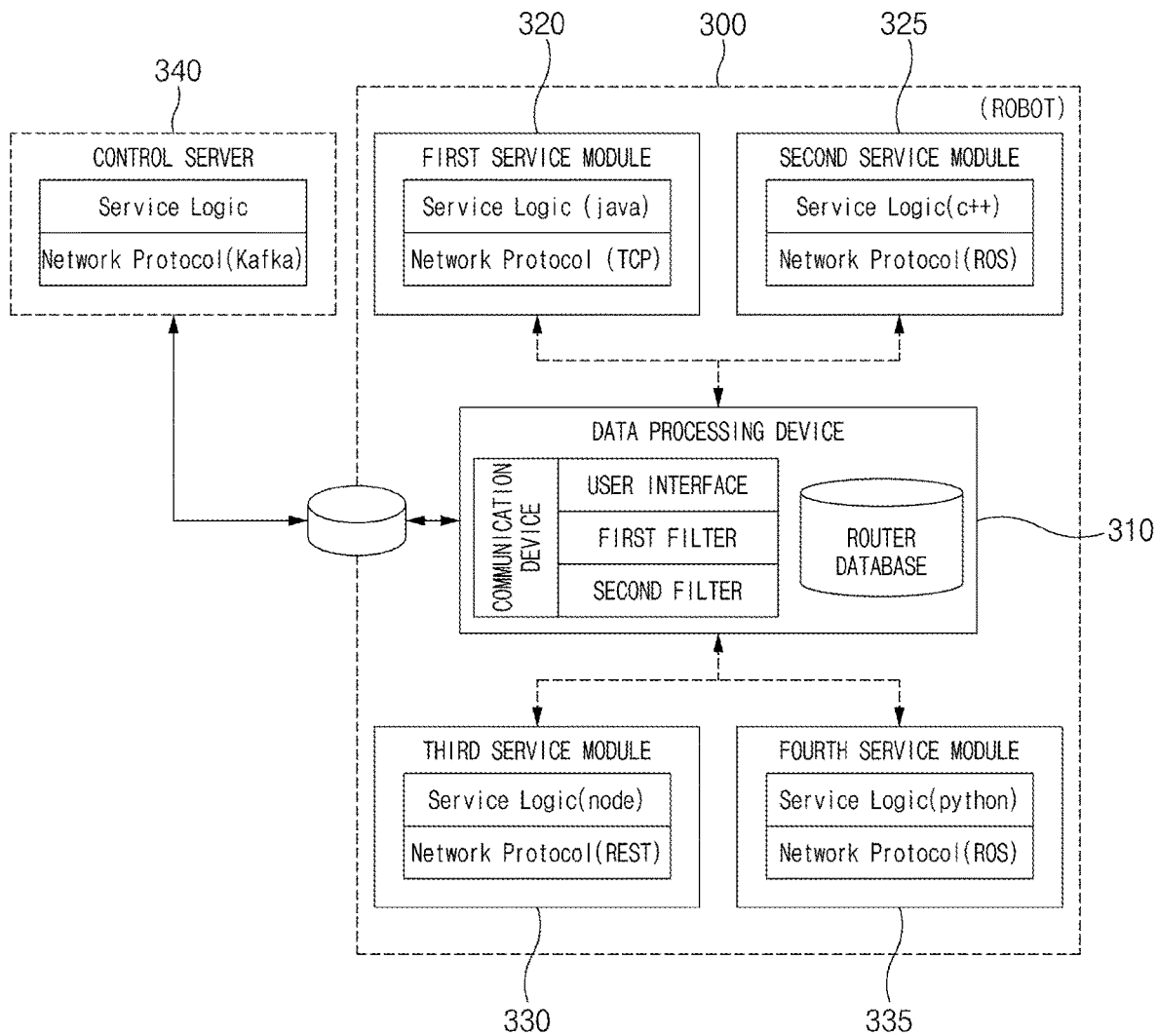
FIG. 3 is a diagram illustrating a method of communicating with a control server in a data processing device according to an embodiment of the present disclosure.

FIG. 3 is a diagram illustrating a method of communicating with a control server in a data processing device according to an embodiment of the present disclosure.

A data processing device 310 according to an embodiment may be included in a robot system 300 and may communicate with a control server 340. For example, the robot system 300 may include a first service module 320, a second service module 325, a third service module 330, a fourth service module 335, and the data processing device 310. The service module included in the robot system 300 may represent a module for performing a specific function and/or service of the robot system 300. Additionally, the robot system 300 may represent a delivery robot system, a patrol robot system, a serving robot system, or the like.

The control server 340 may perform an operation of transmitting target data to the robot system 300 and receiving data related to the robot system 300 from the robot system 300. For example, the control server 340 may perform the operation of transmitting and/or receiving the above-described data based on the Kafka communication protocol.

The data processing device 310 may include a first filter, a second filter, a user interface, a communication device, and a router database. The data processing device 310 may receive target data from the control server 340 through the communication device. The data processing device 310 may apply source codes input through a user interface to at least one of the first filter, the second filter, or any combination thereof. The data processing device 310 may apply the target data to each of the first and second filters and transmit encapsulated target data to a target service module. Here, the target service module may represent at least one of the first service module 320, the second service module 325, the third service module 330, the fourth service module 335, or any combination thereof. Therefore, the target data may be transmitted from the control server 340 to one service module and may additionally be transmitted to service modules that may be classified according to service logic or network protocols.

On the other hand, when the data processing device 310 is absent in the robot system 300, the robot system 300 may need to implement a data filter in each service module to receive target data from the control server 340 and transmit the received target data to a target service module. For example, the data filter may be a filter set to correspond to the reception format of each service module and may be changed according to a source and a destination. Such a system may be difficult to maintain or manage and may have problems in establishing a comprehensive authentication system for security. Moreover, the system may have a highly complex structure because, even when the system performs an operation of transmitting data to the same service modules, the operation may be processed differently depending on structures of the data. Accordingly, it is possible to solve the above-mentioned problems in such a way that the robot system 300 includes the data processing device 310 and processes target data received from the control server 340 through the data processing device 310.

Figure 4:
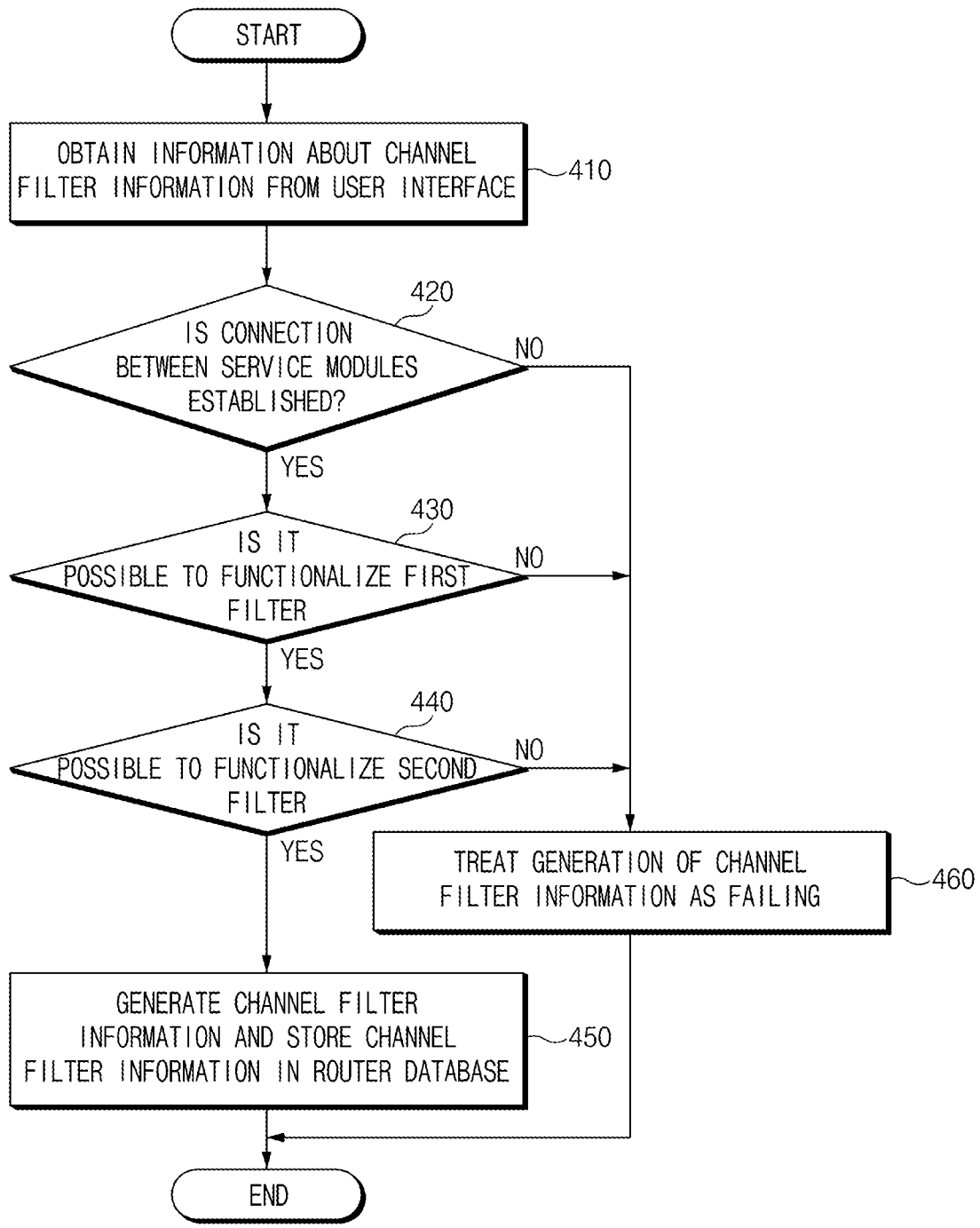
FIG. 4 is a flowchart illustrating a method of registering channel filter information in a data processing device according to an embodiment of the present disclosure.

FIG. 4 is a flowchart illustrating a method of registering channel filter information in a data processing device according to an embodiment of the present disclosure.

In operation 410, a data processing device (e.g., the data processing device 100 of FIG. 1) according to an embodiment may obtain information related to channel filter information from a user interface. For example, the data processing device may obtain source codes of a first filter and a second filter through the user interface. The data processing device may identify at least one of a command related to target data, a reception type, a transmission type, a target service module, or any combination thereof through the user interface. That is, the data processing device may identify the command related to the target data, the reception type, the transmission type, the target service module, source codes of the first filter, and source codes of the second filter with information about the channel filter information.

In operation 420, the data processing device may identify whether a connection between service modules is established. For example, the data processing device may identify whether each of a first service module (e.g., the first service module 320 in FIG. 3), a second service module (e.g., the second service module 325 in FIG. 3), a third service module (e.g., the third service module 330 in FIG. 3) and a fourth service module (e.g., the fourth service module 335 in FIG. 3) is connected to the data processing device.

In operation 460, the data processing device may treat generation of channel filter information as failing based on connection between service modules not being established in operation 420. That is, the data processing device may not generate channel filter information when there is no connection between service modules.

In operation 430, the data processing device may determine whether it is possible to functionalize a first filter, based on the connection between the service modules. For example, the data processing device may functionalize the first filter written in a script that receives target data as a parameter.

In operation 440, the data processing device may determine whether it is possible to functionalize a second filter based on the case that it is possible to functionalize the first filter. For example, the data processing device may functionalize the second filter written in a script that receives encapsulated target data as a parameter.

In operations 430 and 440, the data processing device may treat generation of channel filter information as failing when it is hard to functionalize either of the first or second filters. That is, the data processing device may not generate channel filter information when it is hard to functionalize either of the first or second filters.

In operation 450, the data processing device may generate channel filter information and store the channel filter information in the router database. The data processing device may identify the channel filter information regarding the target data received from the router database each time target data is received from the control server after the generated channel filter information has been stored in the router database. Therefore, the channel filter information may be input from a user interface and available in the data processing device through a user input.

Figure 5:
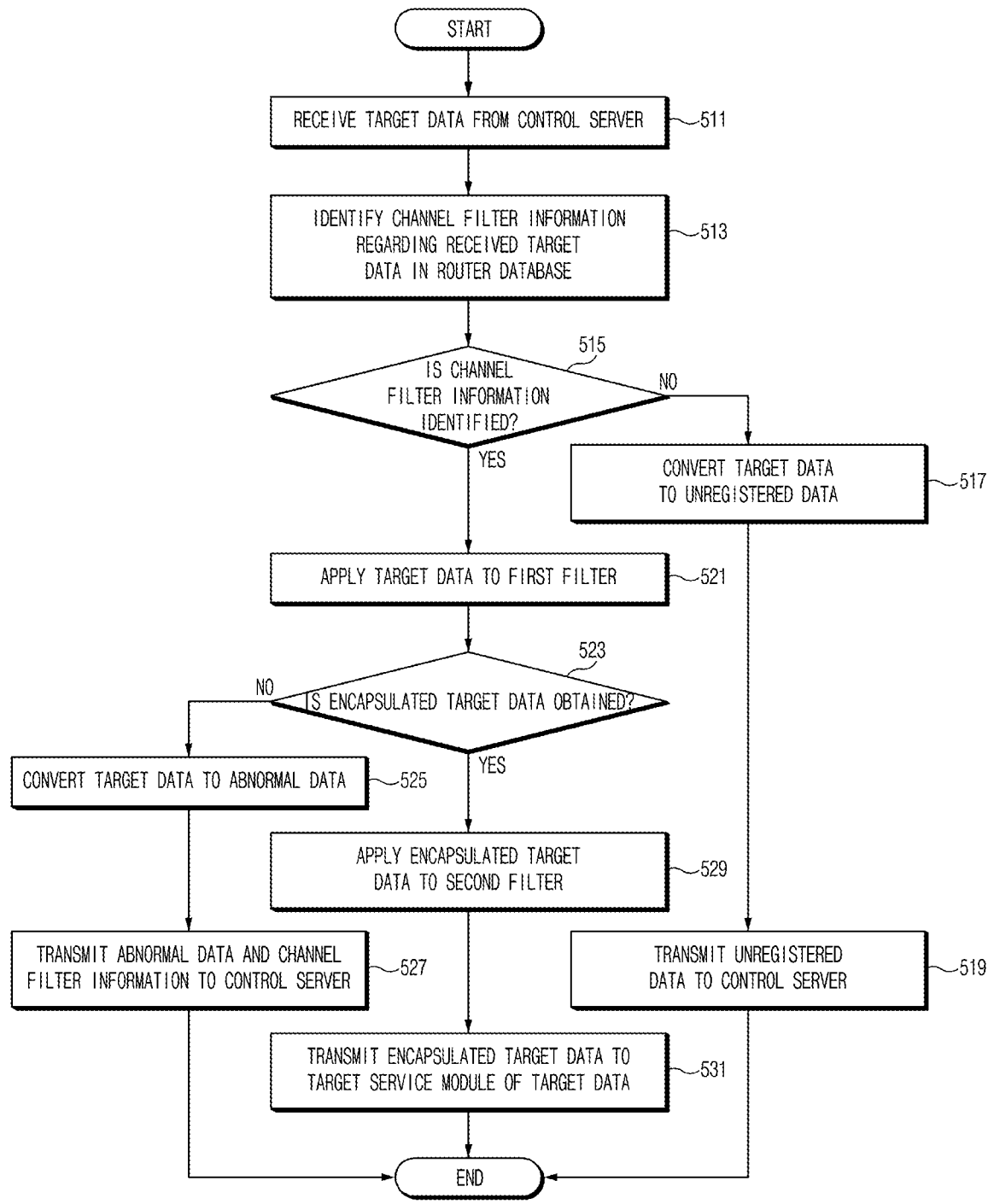
FIG. 5 is a flowchart illustrating a method of transmitting target data to a target service module in a data processing device according to an embodiment of the present disclosure.

FIG. 5 is a flowchart illustrating a method of transmitting target data to a target service module in a data processing device according to an embodiment of the present disclosure.

In operation 511, a data processing device (e.g., the data processing device 100 of FIG. 1) according to an embodiment may receive target data from a control server through a communication device. Thereafter, in operation 513, the data processing device may identify channel filter information regarding the received target data in a router database. That is, the data processing device may determine whether there is channel filter information for the received target data by referring to the router database.

In operation 515, the data processing device may determine whether the channel filter information is identified in the router database. In operation 521, the data processing device may apply the target data to the first filter that encapsulates the target data based on the channel filter information being identified. That is, the data processing device may perform a logic included in the first filter written in a script by applying the target data to the first filter. Alternatively, the data processing device may convert the target data into unregistered data in operation 517 and transmit the unregistered data to a control server in operation 519, based on the channel filter information not being identified.

In operation 523, the data processing device may determine whether the encapsulated target data is obtained based on the target data being applied to the first filter. A detailed description of this is provided later with reference to FIG. 6 below. In operations 525 to 527, the data processing device may convert the target data into abnormal data and transmit the abnormal data and channel filter information to the control server, based on the encapsulated target data not being obtained from the first filter. In other words, the data processing device may classify target data as normal data or abnormal data depending on whether the target data meets passing conditions written in the script of the first filter. Additionally, when the target data is classified as abnormal data, the data processing device may discard the abnormal data by converting the target data into abnormal data and transmitting the abnormal data to the control server.

In operation 529, the data processing device may apply the encapsulated target data to a second filter that converts the format of the encapsulated target data based on obtaining the encapsulated target data from the first filter. In operation 531, the data processing device may transmit the encapsulated target data to a target service module of the target data.

FIG. 6 is a diagram illustrating source codes that implement a first filter in a data processing device according to an embodiment of the present disclosure.

Referring to FIG. 6, codes for implementing a first filter may be included partially in source codes 600. The source codes 600 may include first source codes 610, second source codes 620, third source codes 630, fourth source codes 640, fifth source codes 650, sixth source codes 660, and seventh source codes 670.

The first source codes 610 may include an operation of decoding target data with a predetermined key (e.g., shown as "key" in FIG. 6). For example, the data processing device (e.g., the data processing device 100 of FIG. 1) may decode target data with the predetermined key based on the target data and channel filter information being applied to the first filter by executing the first source codes 610. Here, the predetermined key may be used as 'patrol_robot', as shown in FIG. 6, but it is not limited thereto. The data processing device may obtain decoded target data (e.g., shown as "decoded_target data" in FIG. 6) through the operation of decoding the target data.

The second source codes 620 may include an operation for parsing the target data. For example, the data processing device may parse the decoded target data into a target format by executing the second source codes 620 to obtain parsed data (e.g., shown as "parsed" in FIG. 6). Here, the target format may be the JSON (JavaScript Object Notation) format, but it is not limited thereto. The data processing device may convert the target data into abnormal data based on a failure in parsing of the decoded target data based on the target format and transmit the abnormal data and channel filter information to the control server through a communication device.

The third source codes 630 may include an operation of verifying parsed data using an authentication token. For example, the data processing device may verify whether the parsed data includes a predetermined authentication token based on the parsed data being obtained through parsing of the decoded target data according to the target format by executing the third source codes 630. Here, the authentication token may be "iefk2ad1," as shown in FIG. 6, but it is not limited thereto. The data processing device may convert the target data into abnormal data and transmit the abnormal data and channel filter information to the control server through the communication device, based on the authentication token not being included in the decoded target data.

The fourth source codes 640 may include operations of generating payload data (e.g., shown as "payload" in FIG. 6) by extracting specific packets from the target data. For example, the data processing device may extract a first packet related to a command, a second packet related to a data state, and a third packet related to a message from the target data and generate payload data based on the first packet to the third packet by executing the fourth source codes 640. The data processing device may extract only necessary data from the target data by executing the fourth source codes 640, thereby reducing overhead in a data reception and/or transmission process.

The fifth source codes 650 may represent an operation of specifying a name capable of referring to operations included in the first filter. For example, the operations included in the first filter may represent a single data sequence in which target data is received from the control server and transmitted to the target service module. Therefore, the data processing device may specify performing of the above-described operations as one name, which may be used as a channel name.

The sixth source codes 660 may include operations of encapsulating payload data. For example, the data processing device may encode the payload data based on a predetermined key (e.g., a predetermined key included in the first source codes 610) by executing the sixth source codes 660. Thereafter, the data processing device may apply a header related to the information about a robot including the data processing device and a tail related to the serial information of the robot to the encoded payload data to obtain the encapsulated data.

The seventh source codes 670 may include an operation of returning the encapsulated data to the data processing device. The data processing device may obtain the encapsulated target data from the first filter by executing the seventh source codes 670.

FIG. 7 is a diagram illustrating source codes that implement a second filter in a data processing device according to an embodiment of the present disclosure.

Referring to FIG. 7, codes for implementing a second filter may be included partially in source codes 700. For example, a data processing device (e.g., data processing device 100 of FIG. 1) may convert the format of encapsulated target data (e.g., shown as "encapsulated" in FIG. 7) into a reception format by executing the source codes 700. The data processing device may obtain the reception format of a target service module from channel filter information. The data processing device may obtain the encapsulated target data, converted in the reception format, from the second filter. The source codes 700 may convert the encapsulated target data into the String type in the JSON format, convert the encapsulated target data from the String format to the Byte type, and convert the encapsulated target data from the XML format to the HTML type. However, a method by which the data processing device converts the format of the encapsulated target data is not limited thereto.

FIG. 8 is a diagram illustrating a method of generating channel filter information based on information extracted from a user interface in a data processing device according to an embodiment of the present disclosure.

A data processing device (e.g., data processing device 100 of FIG. 1) according to an embodiment may further include a user interface. For example, the data processing device may further include a user interface that receives source codes for a first filter and a second filter from a user. The data processing device may apply source codes input through the user interface to at least one of the first filter, the second filter, or any combination thereof.

The data processing device may generate channel filter information 800 based on information identified from the user interface. For example, the data processing device may identify at least one of a command related to target data, a reception type, a transmission type, a target service module, or any combination thereof from the user interface.

The data processing device may generate the channel filter information 800 by binding at least one of a command, a reception type, a transmission type, a target service module, or any combination thereof.

Referring to the channel filter information 800 shown in FIG. 8, the command may indicate a command included in target data. The reception type may indicate a protocol type to be used to receive target data. Reception options may indicate option settings provided according to a reception protocol type. The transmission type may indicate a protocol type to be used for data transmission. Transmission options may indicate option settings provided according to a transmission protocol type.

As described above, the command, the reception type, the reception options, the transmission type, the transmission options, and the target service module may be input by a user through the user interface, but they are not limited thereto and may be extracted from target data.

Figure 9:
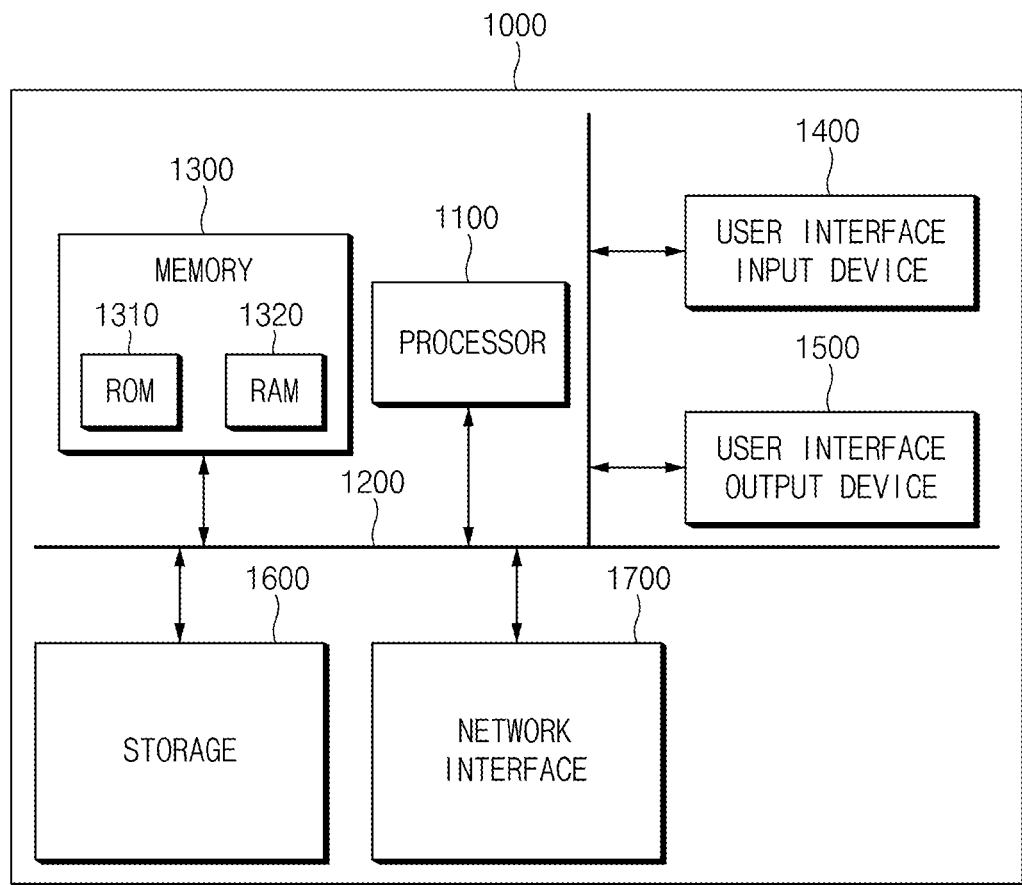
FIG. 9 shows a computing system related to a data processing apparatus or data processing method according to an embodiment of the present disclosure.

FIG. 9 shows a computing system related to a data processing apparatus or data processing method according to an embodiment of the present disclosure.

Referring to FIG. 9, a computing system 1000 related to a data processing apparatus or data processing method may include at least one processor 1100, a memory 1300, a user interface input device 1400, a user interface output device 1500, a storage (i.e., a memory) 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the embodiments disclosed herein may be embodied directly in hardware or a software module executed by the processor 1100 or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 100, and the processor 100 may read information out of the storage medium and may record information in the storage medium. Alternatively, the storage medium may be integrated with the processor 100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of embodiments of the present disclosure, and various modifications and variations may be made without departing from the essential characteristics of embodiments of the present disclosure by those skilled in the art to which the present disclosure pertains.

The embodiments described herein may be implemented with hardware components and software components and/or a combination of the hardware components and the software components. For example, the apparatus, method, and components described in the embodiments may be implemented using a general-purpose or special purpose computer, such as a processor, a controller, and an arithmetic logic unit (ALU), a digital signal processor, a microcomputer, a field programmable array (FPGA), a programmable logic unit (PLU), a microprocessor, or any other device capable of executing and responding to instructions. The processing device may run an operating system (OS) and a software application that runs on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such as a parallel processor.

The software may include a computer program, a piece of code, an instruction, or some combination thereof for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by a computer readable recording medium.

The above-described methods may be embodied in the form of program instructions that can be executed by various computer means and recorded on a computer-readable medium. The computer-readable medium may include program instructions, data files, data structures, or the like, singly or in combination, and the program instructions recorded on the medium may be specially designed and constructed for embodiments or may be known and available to those skilled in the art of computer software. Examples of computer readable recording media include magnetic media such as hard disks, floppy disks, and magnetic tapes, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

The hardware device described above may be configured to operate as one or a plurality of software modules to perform the operations of embodiments of the present disclosure, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

Accordingly, the embodiments disclosed in the present disclosure are not intended to limit the technical idea of the embodiments of the present disclosure but to describe exemplary embodiments of the present disclosure, and the scope of the technical idea of the embodiments of the present disclosure is not limited by the embodiments. The scope of protection of the embodiments of the present disclosure should be interpreted by the following claims, and all technical ideas within the scope equivalent thereto should be construed as being included in the scope of the embodiments of the present disclosure.

The effects of the data processing device and the data processing method according to embodiments of the present disclosure are given as follows.

According to at least one of the embodiments of the present disclosure, it is possible to perform data exchange based on one channel filter information by identifying channel filter information related to target data in a router database, even when service modules have different development languages, protocols, and data formats and increase maintenance of data communication for each service module.

Further, according to at least one of the embodiments of the present disclosure, it is possible to obtain encapsulated target data by applying target data and channel filter information to a first filter that encapsulates the target data to solve the problem of difficulty in applying comprehensive authentication policies due to a distributed structure and uniformly apply authentication and security policies to all service modules by simply writing a script in the first filter.

Further, according to at least one of the embodiments of the present disclosure, it is possible to apply encapsulated target data to a second filter that converts the format of the encapsulated target data, and integration is possible simply by registering a channel through UI without additional implementation of different protocols and data formats used for linking internal/external service modules and link service modules by simply writing a script according to the reception format of each target service module.

In addition, various effects may be provided that are directly or indirectly understood through the disclosure.

Hereinabove, although embodiments of the present disclosure have been described with reference to exemplary embodiments and the accompanying drawings, the embodiments of the present disclosure are not limited thereto, but they may be variously modified and altered by those skilled in the art to which the present disclosure pertains without departing from the spirit and scope of the embodiments of the present disclosure claimed in the following claims.

What is claimed is:

1. A data processing method, the method comprising:
receiving target data from a control server through a communication device;
attempting to identify channel filter information regarding the target data in a router database;
obtaining encapsulated target data by applying the target data and the channel filter information to a first filter that encapsulates the target data based on the channel filter information being identified in the router database; and
transmitting the encapsulated target data to a target service module of the target data by applying the encapsulated target data to a second filter that converts a format of the encapsulated target data.

2. The method of claim 1, wherein in response to the channel filter information not being identified in the router database, the method further comprises:
converting the target data to unregistered data; and
transmitting the unregistered data to the control server through the communication device.

3. The method of claim 1, wherein obtaining the encapsulated target data comprises:
decoding the target data with a predetermined key based on the target data and the channel filter information being applied to the first filter; and
parsing the decoded target data into a target format to obtain parsed data.

4. The method of claim 3, further comprising:
verifying whether the parsed data includes a predetermined authentication token based on the decoded target data being parsed according to the target format and the parsed data being obtained; and
generating payload data by extracting a first packet related to a command, a second packet related to a data state, and a third packet related to a message from the target data.

5. The method of claim 4, further comprising:
encoding the payload data based on the predetermined key; and
obtaining the encapsulated data by applying a header related to information about a robot including a data processing device and a tail related to serial information of the robot to the encoded payload data.

6. The method of claim 4, wherein in response to the authentication token not being included in the decoded target data, the method further comprises:
converting the target data into abnormal data; and
transmitting the abnormal data and the channel filter information to the control server through the communication device.

7. The method of claim 3, wherein in response to a failure in parsing of the decoded target data based on the target format, the method further comprises:
converting the target data into abnormal data; and
transmitting the abnormal data and the channel filter information to the control server through the communication device.

8. The method of claim 1, wherein obtaining the encapsulated target data comprises:
obtaining a reception format of the target service module extracted from the channel filter information; and
transmitting the encapsulated target data by converting a format of the encapsulated target data to the reception format.

9. The method of claim 1, further comprising applying source codes input through a user interface to the first filter, the second filter, or both the first filter and the second filter.

10. The method of claim 9, further comprising:
identifying a command related to the target data, a reception type, a transmission type, the target service module, or any combination thereof from the user interface; and generating the channel filter information by binding the command, the reception type, the transmission type, the target service module, or any combination thereof.

11. A data processing device, the device comprising:
a communication device configured to support communication between the data processing device and a control server;
a memory configured to store a program; and
one or more processors configured to access the memory and execute the program, wherein the program includes computer-executable instructions for:
receiving target data from the control server through the communication device;
attempting to identify channel filter information regarding the target data in a router database;
obtaining encapsulated target data by applying the target data and the channel filter information to a first filter that encapsulates the target data based on the channel filter information being identified in the router database; and
transmitting the encapsulated target data to a target service module of the target data by applying the encapsulated target data to a second filter that converts a format of the encapsulated target data.

12. The device of claim 11, wherein the program further includes computer-executable instructions for:
converting the target data to unregistered data based on the channel filter information not being identified in the router database; and
transmitting the unregistered data to the control server through the communication device.

13. The device of claim 11, wherein the program further includes computer-executable instructions for:
decoding the target data with a predetermined key based on the target data and the channel filter information being applied to the first filter; and
parsing the decoded target data into a target format to obtain parsed data.

14. The device of claim 13, wherein the program further includes computer-executable instructions for:
verifying whether the parsed data includes a predetermined authentication token based on the decoded target data being parsed according to the target format and the parsed data being obtained; and
generating payload data by extracting a first packet related to a command, a second packet related to a data state, and a third packet related to a message from the target data.

15. The device of claim 14, wherein the program further includes computer-executable instructions for:
encoding the payload data based on the predetermined key; and
obtaining the encapsulated data by applying a header related to information about a robot including the data processing device and a tail related to serial information of the robot to the encoded payload data.

16. The device of claim 14, wherein the program further includes computer-executable instructions for:
converting the target data into abnormal data in response to the authentication token not being included in the decoded target data; and
transmitting the abnormal data and the channel filter information to the control server through the communication device.

17. The device of claim 13, wherein the program further includes computer-executable instructions for:
converting the target data into abnormal data in response to a failure in parsing of the decoded target data based on the target format; and
transmitting the abnormal data and the channel filter information to the control server through the communication device.

18. The device of claim 11, wherein the program further includes computer-executable instructions for:
obtaining a reception format of the target service module extracted from the channel filter information; and
transmitting the encapsulated target data by converting the format of the encapsulated target data to the reception format.

19. The device of claim 11, further comprising a user interface configured to receive source codes of the first filter and the second filter from a user, wherein the program further includes computer-executable instructions for applying the source codes input through the user interface to the first filter, the second filter, or both the first filter and the second filter.

20. The device of claim 19, wherein the program further includes computer-executable instructions for:
identifying a command related to the target data, a reception type, a transmission type, the target service module, or any combination thereof from the user interface; and
generating the channel filter information by binding the command, the reception type, the transmission type, the target service module, or any combination thereof.

* * * * *